United States Patent Office 3,357,998
Patented Dec. 12, 1967

3,357,998
COMPLEX AMIDES OF DIHYDRODIBENZO[b,f]
[1,4]OXAZEPINE-10-CARBOXYLIC ACIDS
John W. Cusic and William E. Coyne, Skokie, Ill., assignors to G. D. Searle & Co., Chicago, Ill., a corporation of Delaware
No Drawing. Filed Nov. 6, 1964, Ser. No. 409,610
2 Claims. (Cl. 260—333)

The present invention relates to a group of compounds which are derivatives of dihydrodibenz[b,f][1,4]oxazepine-10-carboxylic acids. More particularly, it relates to a group of compounds having the following general formula

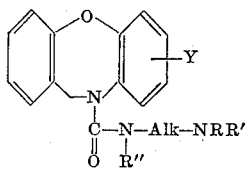

wherein Y is selected from the group consisting of hydrogen and chlorine; Alk is a lower alkylene group separating the nitrogens attached thereto by at least 2 carbon atoms; —NRR′ is selected from the group consisting of di(lower alkyl)amino, 1-pyrrolidinyl, piperidino, morpholino, and 4-methyl-1-piperazinyl; R″ is selected from the group consisting of hydrogen, lower alkyl, and cyclopropylmethyl.

The lower alkylene radicals referred to above contain up to 6 carbon atoms and can be exemplified by groups such as ethylene, trimethylene, and 1,4-pentylene. The lower alkyl radicals referred to above likewise contain up to 6 carbon atoms. Examples of such groups are methyl, ethyl, propyl, isopropyl, and the like. Examples of di(lower alkyl)amino groups would then be dimethylamino, diethylamino, dipropylamino, diisopropylamino, and the like.

The compounds of this invention are useful because of their pharmacological properties. In particular, they are useful as anti-hypertensive agents and anti-inflammatory agents. The latter action is demonstrated by their phenylbutazone-like effect on edematous conditions. In addition, the present compounds possess anti-biotic activity against a variety of organisms. Thus, they inhibit the growth of bacteria such as *Diplococcus pneumoniae*, protozoa such as *Tetrahymena gelleii*, fungi such as *Trichophyton mentagrophytes* and *Candida albicans*, and algae such as *Chlorella vulgaris*. They also inhibit germination of seeds of trifolium.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, oxalic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, dimethyl sulfate, and methyl benzenesulfonate.

The compounds of the present invention are prepared from the appropriate dihydrodibenz[b,f][1,4]oxazepine. This type of compound is reacted with phosgene to give the corresponding N-carbonyl chloride which is then reacted with the appropriate dialkylaminoalkylamine or similar compound to give the compounds of the present invention. The latter reaction is carried out preferably with heating in an inert solvent such as 2-butanone.

The following examples are presented to further illustrate the present invention; they should not be construed as limiting it in spirit or in scope. In these examples, temperatures are indicated in degrees centigrade (° C.) and quantities in parts by weight unless parts by volume are specified. The relationship between parts by weight and parts by volume is the same as that between grams and milliliters.

EXAMPLE 1

435 parts of 2,5-dichloronitrobenzene is heated to 165–170° C. and 218 parts of potassium salicylaldehyde is added with stirring. The temperature is then raised to 190° C. and maintained at 190–200° C. for 6 hours. The mixture is then steamed distilled to remove excess 2,5-dichloronitrobenzene and the residual mixture is extracted with ether. The solvent is evaporated from the ether extract and the residual solid is recrystallized from cyclohexane and then from petroleum ether to give 0-(2-nitro-4-chlorophenyl)salicylaldehyde melting at about 82–83.5° C.

To 103 parts of 0-(2-nitro-4-chlorophenyl)salicylaldehyde in 400 parts of acetone, there is added, with stirring over a period of 15 minutes, 135 parts by volume of a chromic acid-sulfuric acid solution. (This oxidizing solution is prepared from 100 parts of chromic acid, 180 parts of concentrated sulfuric acid, and enough water to give a total volume of 500 parts.) The reaction mixture is cooled to keep it below reflux temperature, and, once the exothermic reaction subsides, it is stirred for 1.5 hours at room temperature. The reaction mixture is then poured into 2000 parts by volume of water and the solid which appears is separated by filtration. This solid is then recrystallized from ethanol to give 0-(2-nitro-4-chlorophenyl)salicylic acid.

A solution of 78 parts of 0-(2-nitro-4-chlorophenyl) salicylic acid in 790 parts of methanol is hydrogenated over Raney nickel at room temperature and atmospheric pressure. When the hydrogenation is complete, the methanol is evaporated from the solution and the residual solid is mixed with 870 parts of xylene and refluxed for 18 hours with continuous removal of water from the reaction mixture as it is formed. The xylene solution is then cooled and filtered to give 8-chloro-10,11-dihydrodibenz [b,f][1,4]oxazepin-11-one. This material melts at about 260–261° C. after recrystallization from ethyl acetate.

To a suspension of 40 parts of 8-chloro-10,11-dihydrodibenz[b,f][1,4]oxazepin-11-one in 710 parts of ether there is added, with stirring under nitrogen, a solution of 12.4 parts of lithium aluminum hydride in 140 parts of ether. The resultant mixture is stirred and refluxed for 19 hours and then decomposed by the successive cautious addition of 16 parts of water, 16 parts of 15% sodium hydroxide solution, and 48 parts of water. The resultant suspension is filtered and the solvent is evaporated from the ether filtrate. The residual solid is recrystallized from petroleum ether to give 8-chloro-10,11-dihydrodibenz [b,f][1,4]oxazepin melting at about 92–97° C.

EXAMPLE 2

To a stirred solution of 8 parts of phosgene in 30 parts of toluene at 5° C., there is added 50 parts of ether. This is followed by the addition of a solution of 12.4 parts of 10,11-dihydrodibenz[b,f][1,4]oxazepin and 6.4 parts of triethylamine in 90 parts of ether while the temperature is maintained at about 7° C. with cooling. The resultant suspension is stirred for 1 hour after the addition is complete before it is filtered. The residue is washed with ether and the solvent is evaporated from the combined filtrates under reduced pressure. The resultant residue is then recrystallized from petroleum ether to give 10,11-dihydrodibenz[b,f][1,4]oxazepine-10-carbonyl chloride melting at about 109–112° C.

If 8-chloro-10,11-dihydrodibenz[b,f][1,4]oxazepine is reacted with phosgene according to the procedure described in the preceding paragraph, the product obtained is 8-chloro-10,11 - dihydrodibenz[b,f][1,4]oxazepine-10-carbonyl chloride. This compound melts at about 101–104° C. after recrystallization from petroleum ether.

EXAMPLE 3

A solution of 8 parts of 10,11-dihydrodibenz[b,f][1,4]oxazepine-10-carbonyl chloride and 3.6 parts of 2-diethylaminoethylamine in 200 parts of 2-butanone is refluxed for 8 hours. The solvent is evaporated from the reaction mixture under reduced pressure and the resultant residue is dissolved in water and washed with ether. The aqueous solution is then made alkaline with aqueous potassium hydroxide solution and extracted with ether. The ether extracts are combined and dried over anhydrous potassium carbonate. Evaporation of the ether solvent then leaves a residual oil which is mixed with 2.7 parts of oxalic acid in ethanol. The oxalate salt precipitates and it is separated and recrystallized from anhydrous ethanol to give N-(2-diethylaminoethyl) - 10,11 - dihydrodibenz[b,f][1,4]oxazepine-10-carboxamide oxalate melting at about 164–170° C. The free base of this compound has the following formula

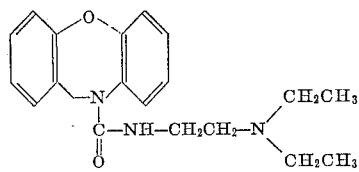

EXAMPLE 4

A solution of 6.5 parts of 8-chloro-10,11-dihydrobenz[b,f][1,4]oxazepine-10-carbonyl chloride and 2.6 parts of 2-diethylaminoethylamine in 160 parts of 2-butanone is refluxed for 18 hours. The butanone solvent is then evaporated from the solution and the oily residue is treated with water and sufficient aqueous potassium hydroxide solution to render the suspension alkaline. The mixture is then extracted with ether and the combined ether extracts are dried over anhydrous potassium carbonate. Evaporation of the ether leaves a residual oil which is reacted with an ethanol solution of 2 parts of oxalic acid to give the oxalate salt. This is recrystallized twice from ethanol to give N-(2-diethylaminoethyl)-8-chloro-10,11-dihydrodibenz[b,f][1,4]oxazepine-10 - carboxamide oxalate melting at about 158–160° C.

EXAMPLE 5

If 2.5 parts of 2-(1-pyrrolidinyl)ethylamine is substituted for the 2-diethylaminoethylamine and the procedure described in Example 4 is repeated, the crude oxalate salt of the product is obtained. This is recrystallized first from ethanol and then from a mixture of ethanol and ethyl acetate to give N-[2-(1-pyrrolidinyl)-ethyl]-8-chloro - 10,11 - dihydrodibenz[b,f][1,4]oxazepine - 10 - carboxamide oxalate melting at about 156–160° C. The free base of this compound has the following formula

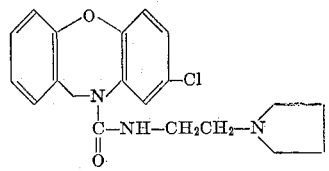

EXAMPLE 6

7.8 parts of 10,11-dihydrodibenz[b,f][1,4]oxazepine-10-carbonyl chloride is reacted with 4.8 parts of 5-diethylamino-2-aminopentane according to the procedure described in Example 4. In this case the crude free amine is dissolved in ethyl acetate and treated several times with charcoal. The solvent is then evaporated from the ethyl acetate solution to give a light yellow oil which is N-(4-diethylamino - 1 - methylbutyl)-10,11-dihydrodibenz[b,f][1,4]oxazepine-10-carboxamide.

EXAMPLE 7

If 7.8 parts of 10,11-dihydrodibenz[b,f][1,4]oxazepine-10-carbonyl chloride is reacted with 5.6 parts of N,N,N'-triisopropylethylenediamine in 2-butanone according to the procedure described in Example 4, there is obtained, after reaction with oxalic acid, N-(2-diisopropylaminoethyl)-N-isopropyl - 10,11 - dihydrodibenz[b,f][1,4]oxazepine-10-carboxamide oxalate. This compound melts at about 165–167° C. after recrystallization from ethanol.

If N,N,N'-trimethyl-1,3-propanediamine is reacted with 10,11 - dihydrodibenz[b,f][1,4]oxazepine - 10 - carbonyl chloride in the same way, there is obtained N-(3-dimethylaminopropyl) - N - methyl - 10,11 - dihydrodibenz[b,f][1,4]oxazepine-10-carboxamide oxalate.

EXAMPLE 8

If the procedure described in Example 4 is repeated using 7.8 parts of 10,11 - dihydrodibenz[b,f][1,4]oxazepine-10-carbonyl chloride and 5.1 parts of N-cyclopropylmethyl-N',N'-diethylethylenediamine in 2-butanone, there is obtained, after reaction with oxalic acid, N-(2-diethylaminoethyl)-N-cyclopropylmethyl - 10,11 - dihydrodibenz[b,f][1,4]oxazepine-10-carboxamide oxalate melting at about 138–141° C. after recrystallization from ethanol.

EXAMPLE 9

If 10,11-dihydrodibenz[b,f][1,4]oxazepine-10-carbonyl chloride is reacted with the appropriate aminoalkylamine according to the procedure described in Example 4, the following compounds are obtained:

N-[2-(4-methyl-1-piperazinyl)ethyl]-10,11-dihydrodibenz[b,f][1,4]oxazepine-10-carboxamide.

N-(2-piperidinoethyl)-10,11-dihydrodibenz[b,f][1,4]oxazepine-10-carboxamide.

N-morpholinoethyl-10,11-dihydrodibenz[b,f][1,4]oxazepine-10-carboxamide.

What is claimed is:

1. N-(2-diisopropylaminoethyl) - N - isopropyl-10,11-dihydrodibenz[b,f][1,4]oxazepine-10 - carboxamide oxalate.

2. N - (2 - diethylaminoethyl) - N - cyclopropylmethyl-10,11-dihydrodibenz[b,f][1,4]oxazepine - 10 - carboxamide oxalate.

References Cited

UNITED STATES PATENTS

| | | | |
|---|---|---|---|
| 3,050,524 | 8/1962 | Yale | 260—293.4 |
| 3,100,207 | 8/1963 | Zirkle et al. | 260—268 |
| 3,210,372 | 10/1965 | Werner | 260—309.6 |
| 3,259,631 | 7/1966 | Yale et al. | 260—333 |

WALTER A. MODANCE, *Primary Examiner.*

N. S. MILESTONE, *Assistant Examiner.*